(12) United States Patent
Lausenhammer

(10) Patent No.: US 9,004,906 B2
(45) Date of Patent: Apr. 14, 2015

(54) CAVITY INSERT FILM FLOW COOLING

(75) Inventor: Manfred Lausenhammer, Konz (DE)

(73) Assignee: Mold-Masters (2007) Limited, Georgetown, ON (CA)

( * ) Notice: Subject to any disclaimer, the term of this patent is extended or adjusted under 35 U.S.C. 154(b) by 575 days.

(21) Appl. No.: 13/036,051

(22) Filed: Feb. 28, 2011

(65) Prior Publication Data

US 2012/0219662 A1   Aug. 30, 2012

(51) Int. Cl.
*B29C 45/73* (2006.01)
*B29C 45/26* (2006.01)
*B29C 45/72* (2006.01)
*B29K 105/00* (2006.01)

(52) U.S. Cl.
CPC ....... *B29C 45/7312* (2013.01); *B29K 2105/253* (2013.01)

(58) Field of Classification Search
USPC ................... 425/547, 552, 526, 533
See application file for complete search history.

(56) References Cited

U.S. PATENT DOCUMENTS

| | | | |
|---|---|---|---|
| 5,423,670 A | 6/1995 | Hamel | |
| 5,522,448 A | 6/1996 | Righi | |
| 6,176,700 B1 | 1/2001 | Gellert | |
| 6,488,881 B2 * | 12/2002 | Gellert | 264/328.16 |
| 7,195,223 B2 | 3/2007 | Manuel et al. | |
| 7,361,009 B2 | 4/2008 | Li | |
| 7,566,216 B2 | 7/2009 | Kmoch et al. | |
| 7,568,906 B2 | 8/2009 | Kmoch et al. | |
| 7,628,605 B2 | 12/2009 | Mai et al. | |
| 7,645,132 B2 | 1/2010 | McCready | |
| 2007/0092596 A1 * | 4/2007 | Li | 425/549 |
| 2008/0026239 A1 | 1/2008 | Balboni et al. | |
| 2008/0268088 A1 | 10/2008 | Kmoch et al. | |
| 2008/0268089 A1 | 10/2008 | Kmoch et al. | |
| 2009/0022844 A1 | 1/2009 | Mai et al. | |

FOREIGN PATENT DOCUMENTS

| | | |
|---|---|---|
| EP | 0688656 A1 | 12/1995 |
| JP | 2002052573 A | 2/2002 |
| WO | WO-2007/144413 A1 | 12/2007 |
| WO | WO-2007/144415 | 12/2007 |
| WO | WO-2010/121349 | 10/2010 |

OTHER PUBLICATIONS

Extended European Search Report, EP Appl. No. 12001286.9, Jun. 6, 2012.
Extended European Search Report, EP Appl. No. 12001287.7, Jun. 6, 2012.
SIPO Search Report; Chinese Appl. No. 201210116097.3; Jul. 11, 2014.

\* cited by examiner

*Primary Examiner* — Dimple Bodawala
*Assistant Examiner* — Robert J Grun
(74) *Attorney, Agent, or Firm* — Medler Ferro PLLC

(57) ABSTRACT

A cavity insert for a mold stack is disclosed, the cavity insert being dimensioned to define a continuous annular cavity insert cooling chamber. The cavity insert also provides a first and second decompression chamber in fluid communication with each end of the cavity insert cooling chamber. Also disclosed is a chamber extension feature in fluid communication with the cavity insert cooling chamber to promote cooling in the downstream region of the cavity insert.

21 Claims, 8 Drawing Sheets

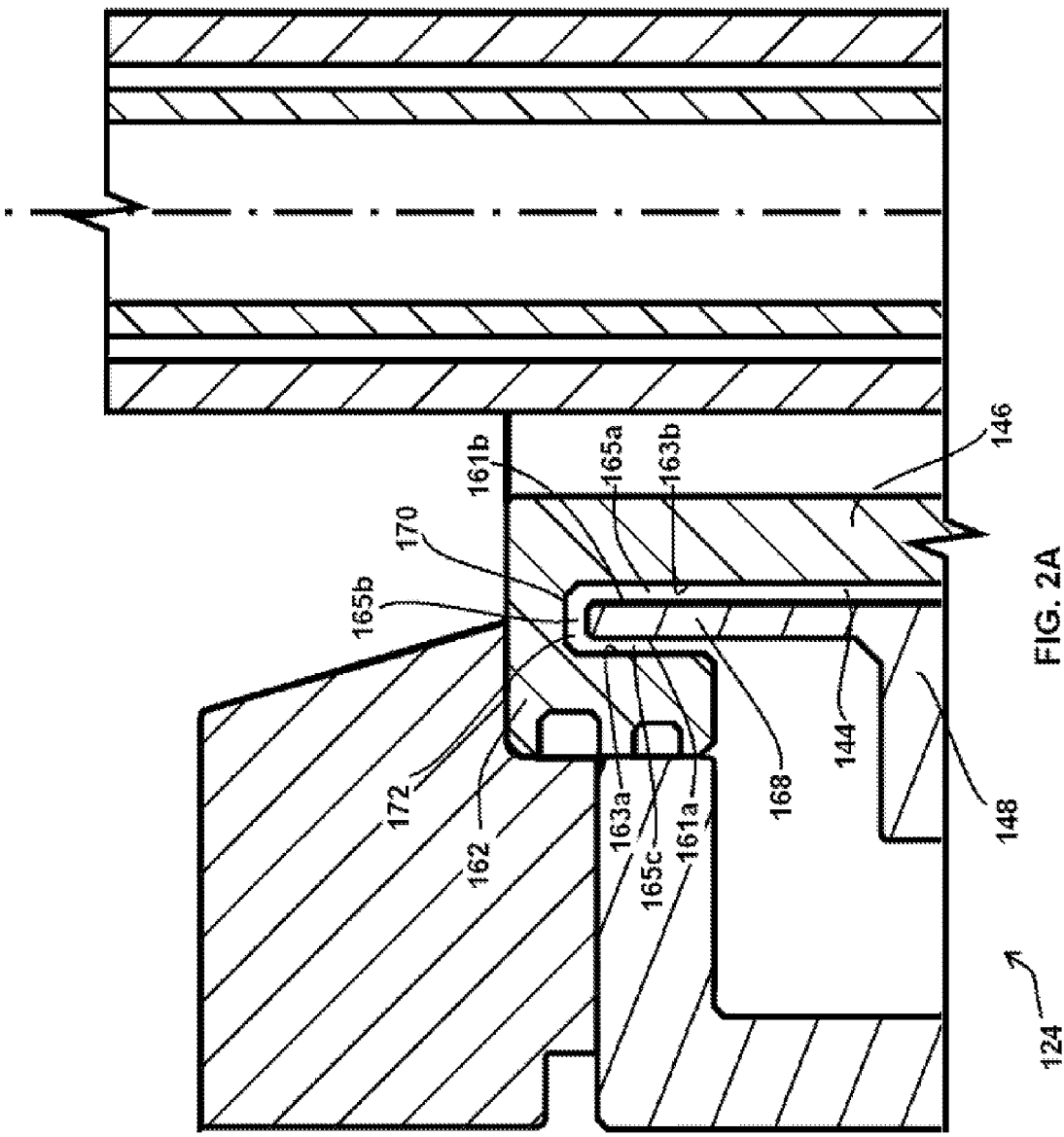

CAVITY INSERT FILM FLOW COOLING

FIELD OF THE INVENTION

The invention relates generally to injection molding systems and in particular to cooling conduit configurations in a preform mold stack.

BACKGROUND OF THE INVENTION

In the art of injection molding, a typical injection mold will contain one or more mold cores and cavities that correspond to the shape of the molded article being produced. A melt stream of moldable material is injected from an injection molding machine into the mold cavities through a hot runner system, where it is allowed to solidify for a period of time before the mold is opened and the newly molded parts are ejected.

One of the most significant factors in affecting the overall cycle time required to produce one or a plurality of molded articles is the time required to solidify or cool the newly molded articles within the mold cavity before the parts are ejected.

In injection molding applications such as the molding of polyethylene terephthalate (PET) preforms, the ability to rapidly cool the molded articles in the mold is of utmost importance since the newly molded preforms are in many instances removed from the mold by a robotic post-mold cooling device as soon as they have solidified to a point where they can be handled without being damaged.

In PET molding an assembly of components, known in the art as a mold stack, defines the mold cavity in which the preform is molded. The inside surface of the preform is defined by a mold core, whereas the outside surface of the preform is generally formed in three sections. The hemispherical, or otherwise shaped, end portion being defined by a gate insert, the elongate body portion being defined by a cavity insert, and the thread/neck portion being defined by a pair of cooperating thread splits. Rapid cooling of the outside of the preform is particularly important since it is the outside of the preform that is handled by the post-mold cooing device immediately upon ejection of the newly molded article from the mold. That being said, inadequate or inefficient cooling of the outside of the preform can result in defective molded articles, and/or have a negative impact upon the time of the overall molding cycle.

As such, a need exists in the art for cooling conduit arrangements that provides rapid and efficient cooling to the elongate body portion of the preform.

SUMMARY OF THE INVENTION

According to an aspect of an embodiment, provided is a cavity insert for a mold stack, the cavity insert comprising, an outer sleeve having an outside surface configured to be received in a mold cavity plate, and an inner portion coaxially receivable within the outer sleeve. The inner portion presents an inner surface defining in part a molding surface, wherein the inner portion and the outer sleeve define a continuous annular cavity insert cooling chamber therebetween. A first decompression chamber is provided in fluid communication with a first end of the annular cavity insert cooling chamber, while a second decompression chamber is provided in fluid communication with a second end of the annular cavity insert cooling chamber.

According to another aspect of an embodiment, provided is a mold assembly for an injection molding machine comprising, a cavity insert body configured to be directly received in a bore of a mold cavity plate, the cavity insert body having at least a portion of an outside surface being dimensionally smaller than the bore of the mold cavity plate thereby defining an annular cavity insert cooling chamber therebetween. A first decompression chamber is provided in fluid communication with a first end of said annular cavity insert cooling chamber, while a second decompression chamber is provided in fluid communication with a second end of said annular cavity insert cooling chamber.

According to a further aspect of an embodiment, provided is a cavity insert for a mold stack, the cavity insert comprising an outer sleeve having an outside surface configured to be received in a mold cavity plate, and an inner portion coaxially receivable within the outer sleeve, the inner portion having an inner surface defining in part a molding surface. The inner portion and the outer sleeve defining a continuous annular cavity insert cooling chamber therebetween, the cavity insert also having a chamber extension positioned in a downstream region of the cavity insert in fluid communication with the cavity insert cooling chamber to provide cooling to the flange portion of the cavity insert.

According to another aspect of an embodiment, provided is a cavity insert for a mold stack, the cavity insert comprising a cavity insert body configured to be directly received in a bore of a mold cavity plate, the cavity insert body having at least a portion of an outside surface being dimensionally smaller than the bore of the mold cavity plate thereby defining an annular cavity insert cooling chamber therebetween. Also provided is a chamber extension positioned in a downstream region of the cavity insert in fluid communication with the cavity insert cooling chamber to provide cooling to the flange portion of the cavity insert.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2A is an enlarged view of the cavity insert of FIG. 2, detailing the chamber extension feature.

DETAILED DESCRIPTION OF EMBODIMENTS OF THE PRESENT INVENTION

Specific embodiments of the present invention will now be described with reference to the figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. In the following description, "downstream" is used with reference to the direction of mold material flow from an injection unit to a mold cavity of an injection molding system, and also to the order of components or features thereof through which the mold material flows from an injection unit to a mold cavity, whereas "upstream" is used with reference to the opposite direction. Although the description of the embodiments hereof is in the context of hot runner injection molding systems, the invention may also be used in other molding arrangements where it is deemed useful. Furthermore, there is no intention to be bound by any expressed or implied theory presented in the preceding technical field, background, brief summary or the following detailed description.

Figure 1:
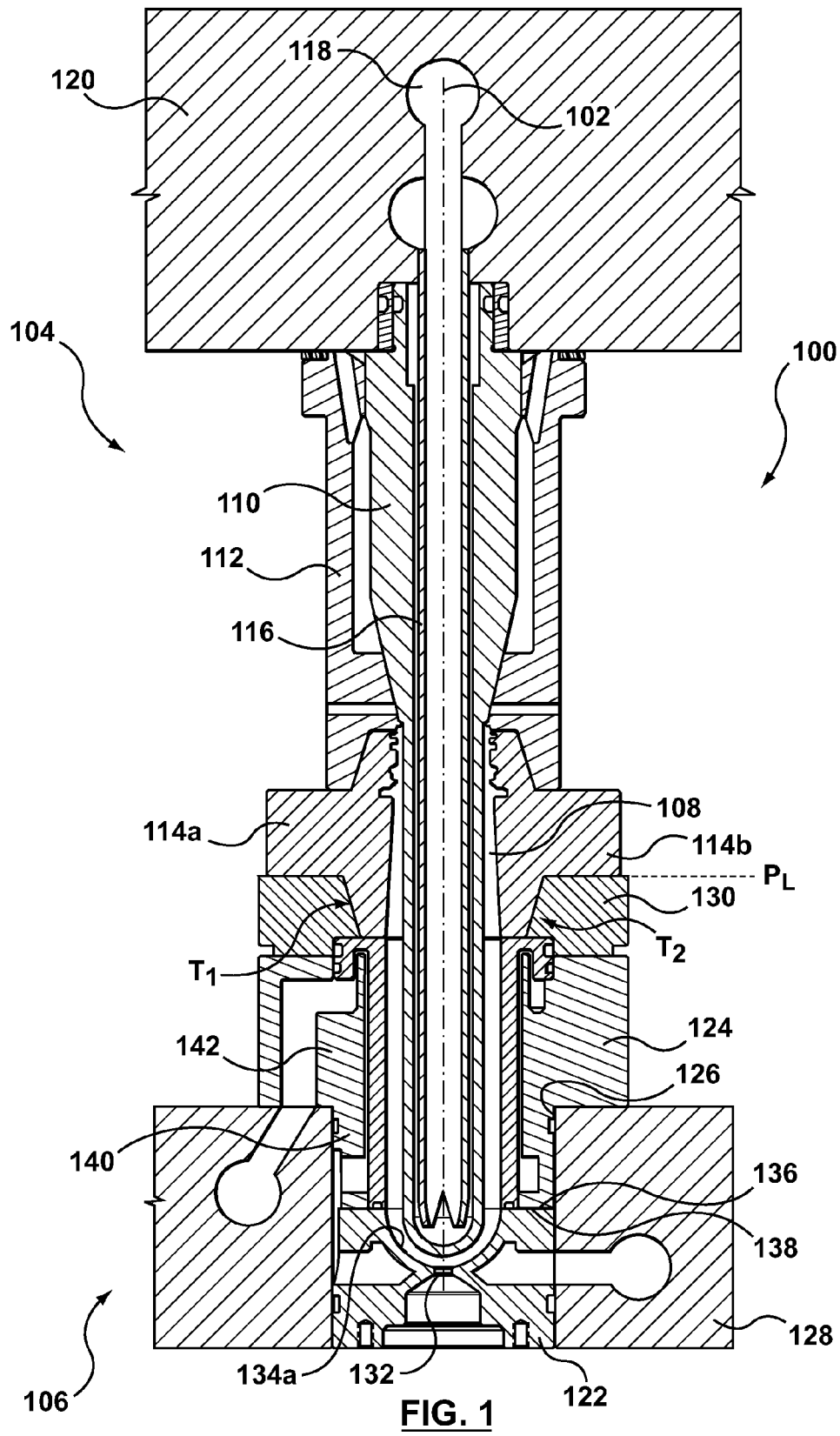
FIG. 1 is a cross-sectional view of a mold stack according to one embodiment of the invention.

FIG. 1 is a sectional view of a mold stack assembly according to an exemplary embodiment of the invention. A plurality of such mold stacks 100 are arranged within an injection molding system, in an array which corresponds to the number of preforms being molded during each injection molding cycle. Each mold stack 100 is concentric about a central axis 102. Mold stack 100 can be generally divided into a core assembly 104 and a cavity assembly 106, separable along a parting line $P_L$, each of which are associated with a respective core half and cavity half of an injection molding system. Core assembly 104 and cavity assembly 106 cooperate to define a mold cavity 108 in which the molded article is formed.

Core assembly 104 of mold stack 100 generally includes a mold core 110, a core support 112 and a split thread insert comprised of first half 114a and second half 114b. Mold core 110 is generally cylindrical and provides a cooling mechanism, such as a bubbler tube 116 in fluid communication with suitable supply/return cooling channels 118 provided in core plate 120. A cooling fluid is circulated through bubbler tube 116, so as to cool the temperature of mold core 110, thereby assisting in the solidification of the melt stream of moldable material injected into mold cavity 108. Split thread insert 114a/114b, which provides the molding surface for the taper and thread region of the preform, also generally comprises a cooling mechanism. For example, each half of the split thread insert 114a/114b may be provided with a cooling circuitry similar to that disclosed in U.S. Pat. No. 5,599,567 which is herein incorporated by reference. As is generally known in the art, split thread insert 114a/114b is configured to be actuated by sliders or similar mechanism (not shown) mounted on a stripper plate (also not shown) to translate forwardly and/or laterally during preform ejection.

Cavity assembly 106 of mold stack 100 generally includes a gate insert 122 and a cavity insert 124 located in series within a bore 126 extending through a cavity plate 128. The cavity assembly may also include an alignment ring 130 to assist in aligning the cavity assembly 106 to the core assembly 104. Gate insert 122 defines a mold gate 132 at the upstream end of the mold cavity 108. Downstream of mold gate 132, gate insert 122 defines a molding surface 134a, forming what is generally the terminal end of a molded preform article molded in mold cavity 108. Downstream face 136 of gate insert 122 is configured to engage the upstream face 138 of cavity insert 124, whereby gate insert 122 and cavity insert 124 concentrically align relative to central axis 102.

Cavity insert 124, in cooperation with mold core 110 define the cylindrical body portion of mold cavity 108. The cavity insert 124 exemplified herein is generally defined by a body portion 140, and a flange portion 142. Body portion 140 of cavity insert 124 extends in a downstream direction perpendicular to upstream face 138 with flange portion 142 generally extending from said body portion 140.

Figure 2:
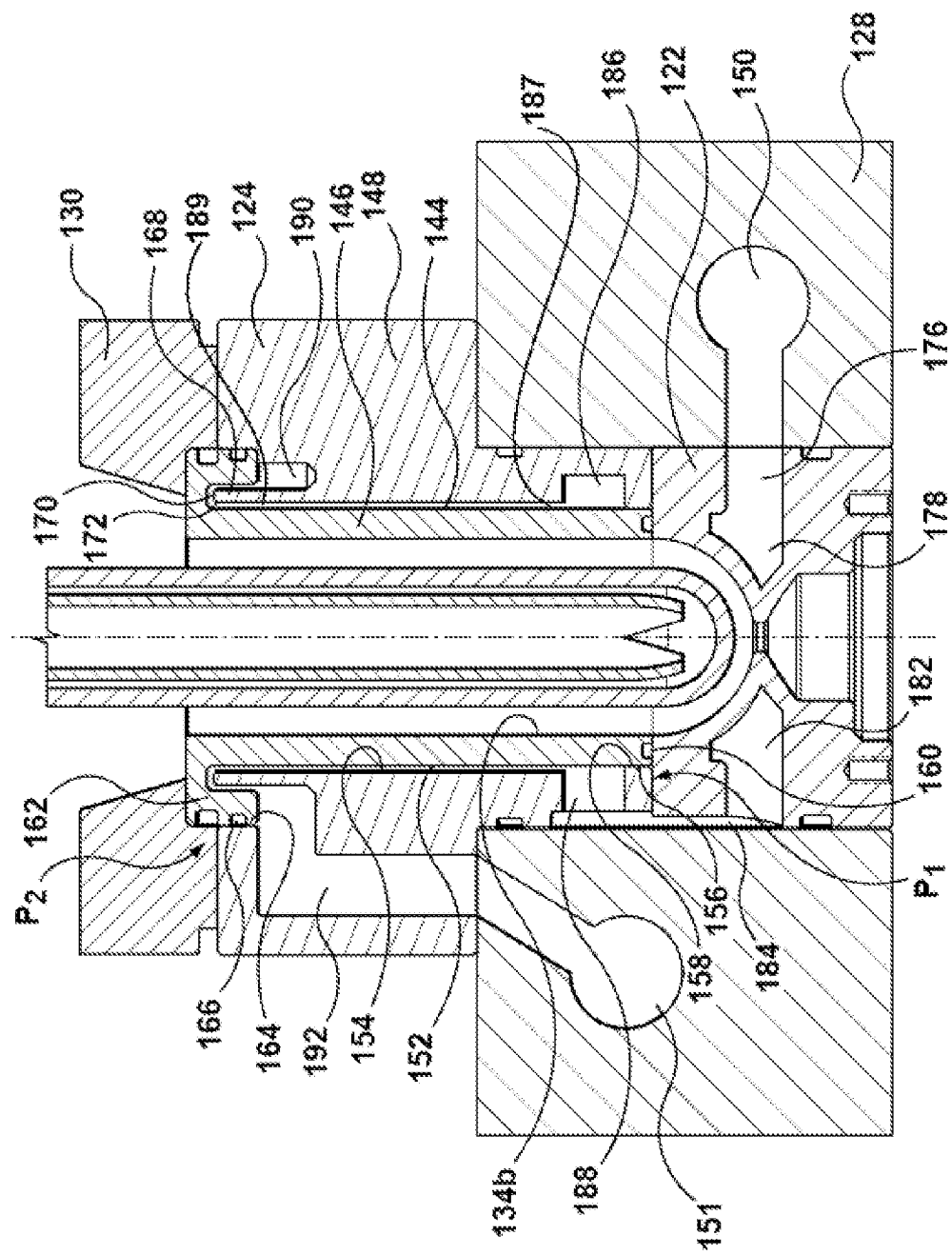
FIG. 2 is an enlarged view of the mold stack of FIG. 1, detailing the cavity insert portion.

Turning now to FIG. 2, shown is an enlarged view of cavity insert 124. In the embodiment shown, cavity insert 124 includes two cavity subcomponents, namely inner portion 146 and outer sleeve 148, where inner portion 146 is coaxially received by outer sleeve 148. The arrangement of inner portion 146 and outer sleeve 148 establishes a largely continuous annular cavity insert cooling chamber 144 therebetween, cavity insert cooling chamber 144 in fluid communication with corresponding cooling fluid supply/return channels, for example channel 150/151 provided in cavity plate 128. A cooling fluid is circulated through cavity insert cooling chamber 144 so as to cool the temperature of cavity insert 124, thereby assisting in the solidification of the melt stream of moldable material. In particular, inner portion 146 is provided with an outside surface 152 having an outer diameter that is less than the inner diameter of surface 154 of outer sleeve 148. Outer sleeve 148 is seated relative to the overall mold stack by virtue of its placement within the surrounding cavity plate 128. Inner portion 146 defines molding surface 134b, and is seated relative to the overall mold stack 100 by virtue of engagement with outer sleeve 148 at points P1 and P2. As shown at P1, an outside contact surface 156 towards the upstream end of inner portion 146 is dimensioned to seat and engage an inside contact surface 158 of outer sleeve 148. Inner portion 146 is generally provided with suitable sealing features to ensure that cooling fluid is retained within cooling chamber 144. For example, as shown in FIG. 2, an o-ring may be provided in a groove 160 situated on an end surface of inner portion 146, so as to provide a sealing effect when engaged with the adjacently positioned gate insert. At P2, the downstream region of inner portion 146 is provided with a flange 162 that seats within a corresponding bore 164 in outer sleeve 148. Flange 162 is also generally provided with suitable sealing features to ensure that cooling fluid is retained within cooling chamber 144. For example, an o-ring may be provided in a groove 166 to ensure a sealed cooling chamber 144. Flange 162 further serves to axially locate alignment ring 130. Alignment ring 130 ensures proper axial alignment between the halves of split thread insert 114a/114b, and subsequently core assembly 104 and cavity assembly 106 of mold stack assembly 100, by way of interfaced tapers shown at T1/T2 (see FIG. 1).

Cooling of preforms in the vicinity of the neck/taper region is a difficult task with many mold stack configurations. In general, cooling of the neck/tapered region is accomplished by way of the split thread insert. In the embodiment represented in FIGS. 1 and 2, further enhancement of the cooling effect in the neck/tapered region is achieved by extending cooling chamber 144 along substantially the entire length of the cavity insert 124. To achieve this, and referring now to FIG. 2A, outer sleeve 148 is provided with a chamber member 168 that positions within a corresponding recess 170 in the downstream portion of cavity insert 124 adjacent the split thread insert, for example in flange 162 of inner portion 146. Chamber member 168 is configured with outside surfaces 161a/161b being dimensionally smaller than the inside walls 163a/163b of corresponding recess 170 in flange 162, thereby defining a chamber extension connected in fluid communication to cooling chamber 144, through which cooling fluid is able to flow. For the discussion provided herein, the chamber extension is generally referred to as a hairpin chamber 172, having a generally annular hairpin or double-backed shaped configuration. As such, cooling fluid that flows through cavity insert 124 is directed not only through the main cooling chamber 144 of the elongated body portion, but also through a first chamber extension portion 165a, a radial chamber extension portion 165b, and a second chamber extension portion 165c, thereby defining the annular loop structure of hairpin chamber 172 adjacent to the split thread insert.

Flow of cooling fluid through cavity assembly 106, and specifically cavity insert cooling chamber 144 is primarily in the form of film flow. Cooling fluid flow may proceed in either direction through cooling chamber 144, depending on the configuration of the associated cooling fluid supply/return lines. Regardless, to promote film flow through cooling chamber 144, provided in fluid communication, and in relation to at least one end of cooling chamber 144 is a decompression chamber, the details of which are presented below. As will be appreciated, the decompression chamber is connected in fluid communication to at least the end of cooling chamber 144 representing the input side, that is the side where cooling fluid is entering cooling chamber 144. To accommodate cooling fluid flow in either direction, and in some cases to generally enhance overall film flow through the annular cooling chamber, the cavity insert will have two decompression chambers, one connected in fluid communication to each end of cooling chamber 144, that is in relation to each of the input and output ends.

As indicated above, in a mold stack arrangement, cooling fluid may be configured to flow in either the upstream or downstream direction, depending on the configuration of the cooling fluid supply lines, and the manner of directing cooling fluid to respective cooling channels. For this explanation, reference will be made to a mold stack in which cooling fluid flows in the downstream direction; that is in the same general direction as the melt flow through cavity 108. The following explanation will also exemplify an arrangement where cooling fluid flows serially through gate insert 122 and cavity insert 124. Having regard to FIG. 2, a flow of cooling fluid from a cooling channel 150 provided for in cavity plate 128 enters gate insert 122 through an inlet channel 176 which extends from the outside diameter of gate insert 122 to gate insert cooling chamber 178. Cooling chamber 178 circumscribes the gate insert molding surface and may generally correspond to the shape thereof, depending on the cooling circuit configuration chosen for gate insert 122. At a location generally diametrically opposite inlet channel 176 the flow of cooling fluid leaves cooling chamber 178 though outlet 182. On exit from gate insert 122, at outlet 182 cooling fluid then flows through a bridge channel 184 which fluidly connects gate insert 122 to cavity insert 124. From bridge channel 184, cooling fluid then flows through at least one radial cooling fluid channel 188 and enters into a first decompression chamber 186 between inner sleeve 146 and outer sleeve 148. First decompression chamber 186 is generally an annular channel on an inside surface of the outer sleeve, and is sized such that cooling fluid is able to substantially fill and encircle first decompression chamber 186 before flowing into a first end 187 of cooling chamber 144. Cooling chamber 144 extends substantially along the entire length of cavity insert 124 and has a cross-sectional area that is substantially smaller than that of first decompression chamber 186, such that in comparison with first decompression chamber 186, cooling chamber can be considered an annular compression cooling chamber. This relative difference in cross sectional area between first decompression chamber 186 and cooling chamber 144 promotes film flow of cooling fluid through cooling chamber 144, wherein substantially the entire annular chamber is in contact with a substantially uniform flow of cooling fluid. From a second end 189 of annular cooling chamber 144, the cooling fluid generally flows into hairpin chamber 172 and into a second decompression chamber 190 provided as an annular channel on a downstream surface of the outer sleeve 148, at an interface between the outer sleeve 148 and the inner portion 146. Second decompression chamber 190 is connected to fluidly communicate with return line 192 which allows cooling fluid to exit cavity insert 124 into a return line 151 provided in cavity plate 128. Further as shown in FIG. 2, the annular cross-section of annular film cooling chamber 144 is uniform (continuous) between the upstream end 187 and the downstream end 189 thereof.

Figure 3:
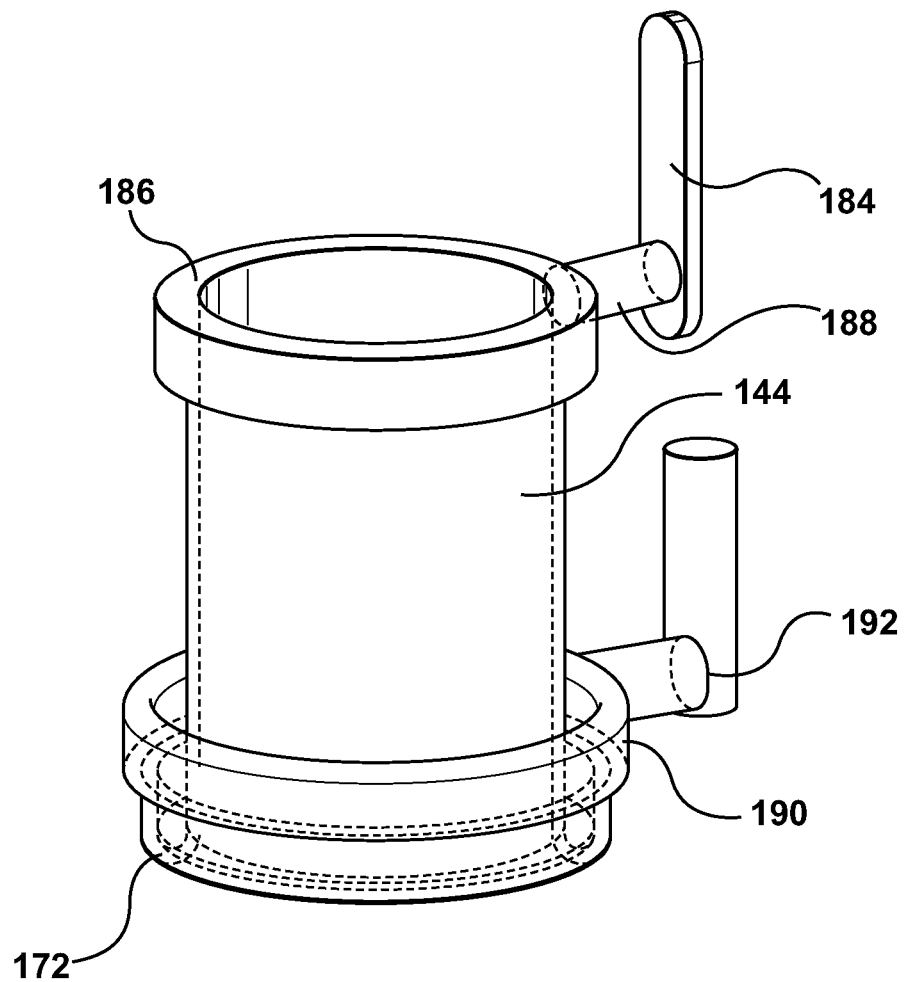
FIG. 3 is a schematic representation of the cooling fluid flow paths through the cavity insert shown in FIGS. 1 and 2.

To illustrate the decompression/compression zones provided by the various chambers described above, presented in FIG. 3 is a representation of the cooling fluid flow path defined by the above arrangement. As shown, on flow of the cooling fluid through bridge channel 184, the cooling fluid enters first decompression chamber 186 through radial cooling fluid channel 188, wherein by virtue of the compression differential with the downstream cooling chamber 144, the cooling fluid substantially fills first decompression chamber 186 and encircles the upstream portion of the cavity insert. The cooling fluid then proceeds to flow into cooling chamber 144, where the cooling flows along the length of cavity insert 124 in substantially film flow. In this respect, film flow is defined as a generally uniform flow of cooling fluid in all regions of the cavity insert cooling chamber in the direction from the inlet, to the outlet. In this way, regions of reduced heat transfer arising from stagnated cooling fluid flow are reduced, increasing the overall cooling efficiency of the cavity insert. Towards the downstream end of cooling chamber 144, the cooling fluid passes through hairpin chamber 172 and enters second decompression chamber 190. From second decompression chamber 190, the cooling fluid continues to flow through return line 192 back to cavity plate 128.

An advantage of the largely continuous annular cavity insert cooling chamber arrangement described above is the overall wetting surface and uniformity of cooling fluid flow is increased when compared to prior art cavity inserts wherein the cooling chamber is comprised of a groove arranged on the outer surface of the insert through which a cooling fluid flows. By providing a decompression chamber prior to flow of the cooling fluid through the cavity insert 124, film flow of the cooling fluid around the entire circumference of the cooling chamber 144 is promoted, thereby reducing hotspots by reducing regions of stagnant cooling fluid flow.

As mentioned briefly above, the supply of cooling fluid to the mold stack arrangement could be in either the upstream or downstream direction, depending on the configuration of the cooling fluid supply lines, and the manner of directing cooling fluid to respective cooling channels. In the exemplary embodiment discussed above, cooling fluid is described as flowing in the downstream direction. As will be appreciated, where the cooling fluid flow through cavity insert 124 is opposite to that described above, that is in the upstream direction, second decompression chamber 190 provides the same functionality as first decompression chamber 186. In other words, on upstream cooling fluid flow through cavity insert 124, second decompression chamber 190 serves to promote film flow through cavity chamber 144.

Figure 4:
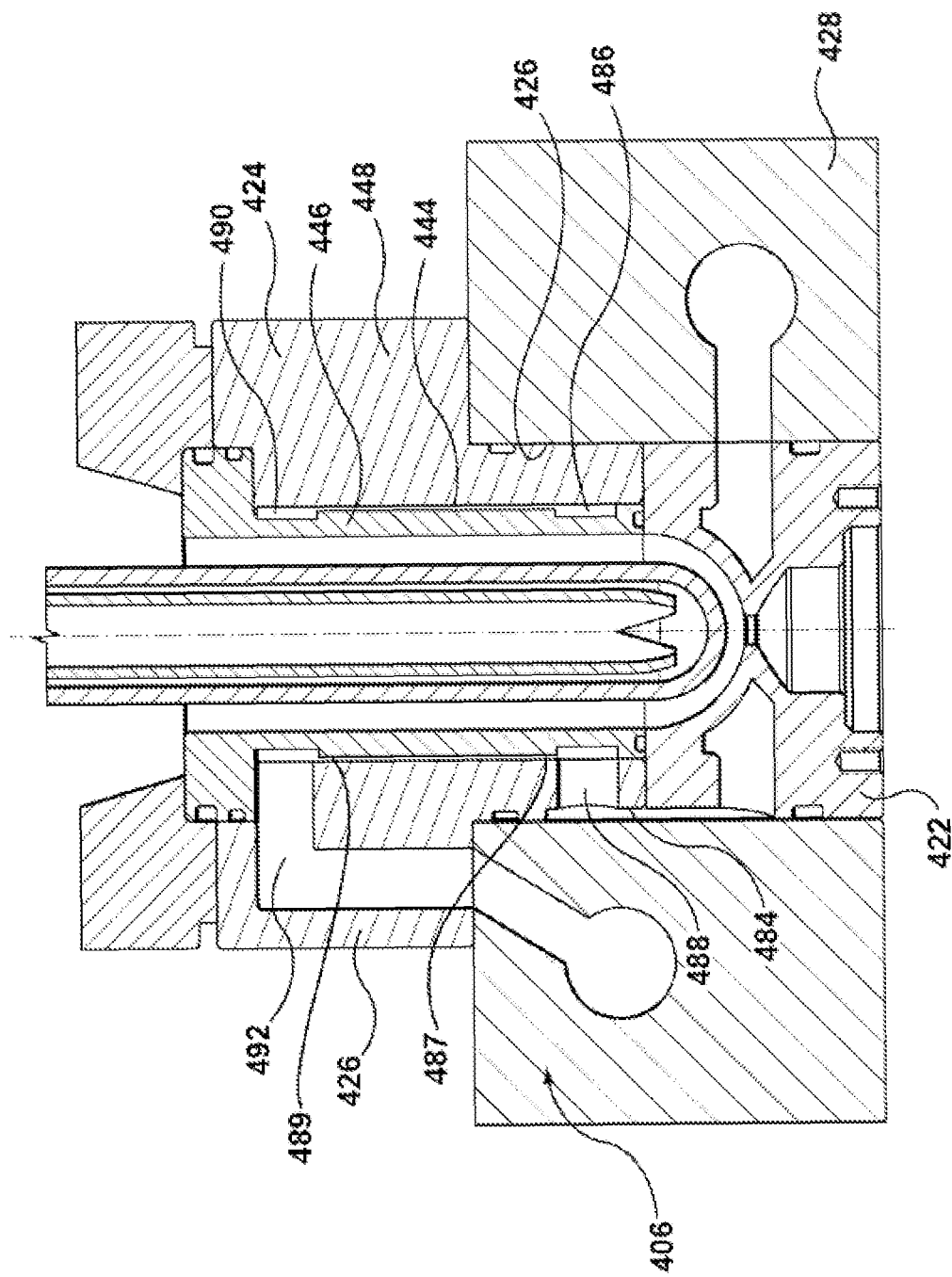
FIG. 4 is an enlarged view of a portion of a mold stack showing an alternate embodiment of the cavity insert.

Referring now to FIG. 4, shown is another embodiment of cavity insert 424 according to the present invention. In the description of this embodiment, the previous embodiment detailed in FIGS. 1 and 2 can be referenced for additional description of like parts, as only differences are discussed in detail below. Features and aspects described in other embodiments can be used accordingly with the present embodiment, and visa versa.

Cavity assembly 406 includes a gate insert 422 and cavity insert 424 located in series within a bore 426 extending through a cavity plate 428. Cavity insert 424 is similar to cavity insert 124 described above, with one exception that cavity insert 424 excludes the hairpin channel feature. As such, in the arrangement shown, cavity insert cooling chamber 444, formed through the coaxial arrangement of inner portion 446 and outer sleeve 448, is connected to fluidly communicate directly with first decompression chamber 486 at first end 487, and second decompression chamber 490 at second end 489. The embodiment of FIG. 4 also provides a variation on the arrangement of first decompression chamber 486 and second decompression chamber 490 where these features are formed generally as an annular channel on the outer surface of the inner portion 446. As such, the decompression chambers 486/490 are provided between inner portion 446 and outer sleeve 448. With this arrangement, that is with first decompression chamber 486 provided between inner portion 446 and outer sleeve 448, first decompression chamber 486 is connected in fluid communication with bridge channel 484 by way of radial cooling fluid channel 488. On the opposite end of cavity insert cooling chamber 444, second decompression chamber 490 is connected so as to provide direct fluid communication with return line 492. In all other respects, the structural and functional characteristics of cavity insert 424 are the same as those described above for the embodiment shown in FIGS. 1 and 2.

Figure 5:
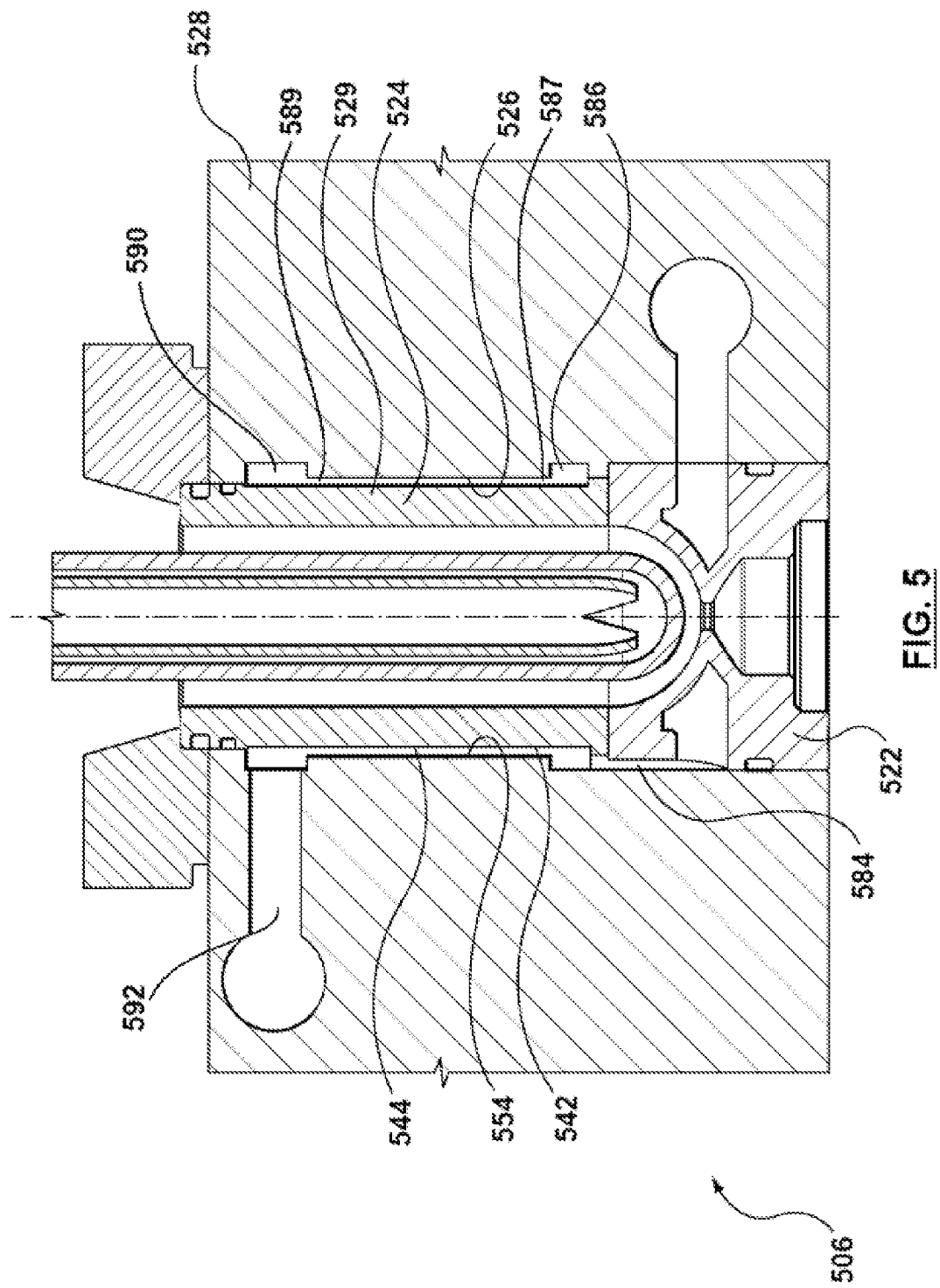
FIG. 5 is an enlarged view of a portion of a mold stack showing a further alternate embodiment of the cavity insert.

Referring now to FIG. 5, shown is another embodiment of cavity insert 524 according to the present invention. In the description of this embodiment, the embodiment detailed in FIGS. 1 and 2 can be referenced for additional description of like parts, as only differences are discussed in detail below. Features and aspects described in other embodiments can be used accordingly with the present embodiment, and visa versa.

Cavity assembly 506 includes a gate insert 522 and cavity insert 524 located in series within a bore 526 extending through a cavity plate 528. Unlike the cavity inserts detailed in the previous embodiments, cavity insert 524 is a one-piece component comprised of a cavity insert body 529. In this form, cavity insert body 529 is configured to seat directly within mold plate 528, and by virtue of cavity insert body 529 having at least a portion of an outside surface 542 with an outer diameter that is less than the inner diameter of surface 554 of bore 526, cavity insert cooling chamber 544 is formed therebetween.

Cavity insert cooling chamber 544 is connected to fluidly communicate directly with first decompression chamber 586 at a first end 587 and second decompression chamber 590 at a second end 589. First decompression chamber 586 and second decompression chamber 590 are generally provided as annular channels formed into bore 526 of cavity plate 528. As such, the decompression chambers 586/590 are provided between cavity insert 524 and mold plate 528. With this arrangement, that is with first decompression chamber 586 formed into bore 526 of cavity plate 528, first decompression chamber 586 is connected so as to fluidly communicate directly to bridge channel 584. On the opposite end of cavity insert cooling chamber 544, second decompression chamber 590 is connected so as to fluidly communicate directly to return line 592. In all other respects, the structural and functional characteristics of cavity insert 524 are generally the same as those described above for the previous embodiments.

Figure 6:
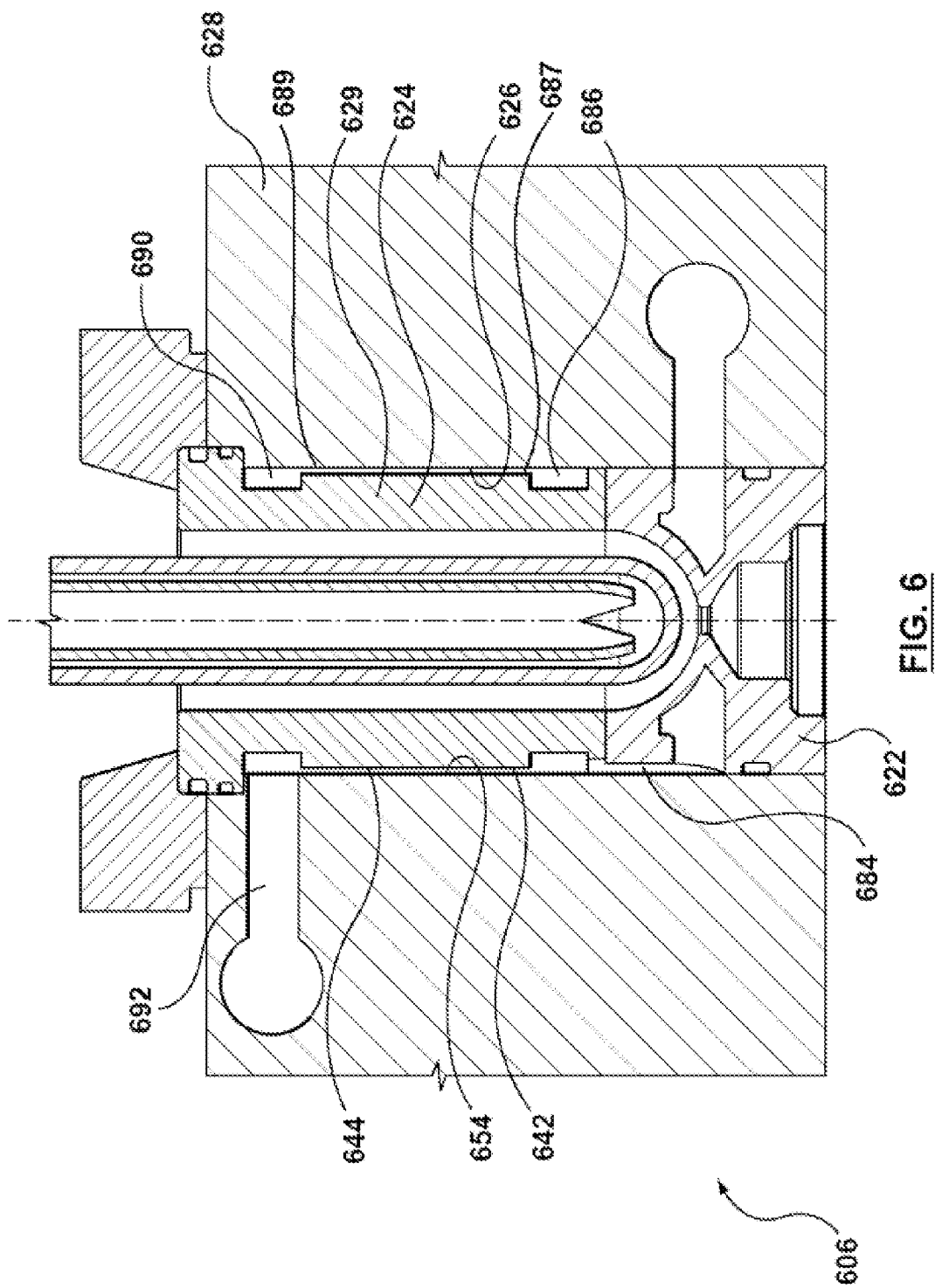
FIG. 6 is an enlarged view of a portion of a mold stack showing a still further alternate embodiment of the cavity insert.

Referring now to FIG. 6, shown is another embodiment of cavity insert 624 according to the present invention. In the description of this embodiment, the embodiment detailed in FIGS. 1 and 2 can be referenced for additional description of like parts, as only differences are discussed in detail below. Features and aspects described in other embodiments can be used accordingly with the present embodiment, and visa versa.

Cavity assembly 606 includes a gate insert 622 and cavity insert 624 located in series within a bore 626 extending through a cavity plate 628. Unlike the cavity inserts detailed in the FIGS. 1 through 4, and similar to that detailed in FIG. 5, cavity insert 624 is a one-piece component comprised of a cavity insert body 629. In this form, cavity insert body 629 is configured to seat directly within mold plate 628, and by virtue of cavity insert body 629 having at least a portion of an outside surface 642 with an outer diameter that is less than the inner diameter of surface 654 of bore 626, cavity insert cooling chamber 644 is formed therebetween.

Cavity insert cooling chamber 644 is connected to fluidly communicate directly with first decompression chamber 686 at first end 687 and second decompression chamber 690 at second end 689. Unlike the embodiment shown in FIG. 5, first decompression chamber 686 and second decompression chamber 690 are generally provided as annular channels formed into an outside surface of cavity insert 624. As such, the decompression chambers 686/690 are provided between cavity insert 624 and mold plate 628. With this arrangement, that is with first decompression chamber 686 formed into an outside surface of cavity insert 624, first decompression chamber 686 is connected so as to fluidly communicate directly to bridge channel 684. On the opposite end of cavity insert cooling chamber 644, second decompression chamber 690 is connected so as to fluidly communicate directly to return line 692. In all other respects, the structural and functional characteristics of cavity insert 624 are generally the same as those described above for the previous embodiments.

Figure 7:
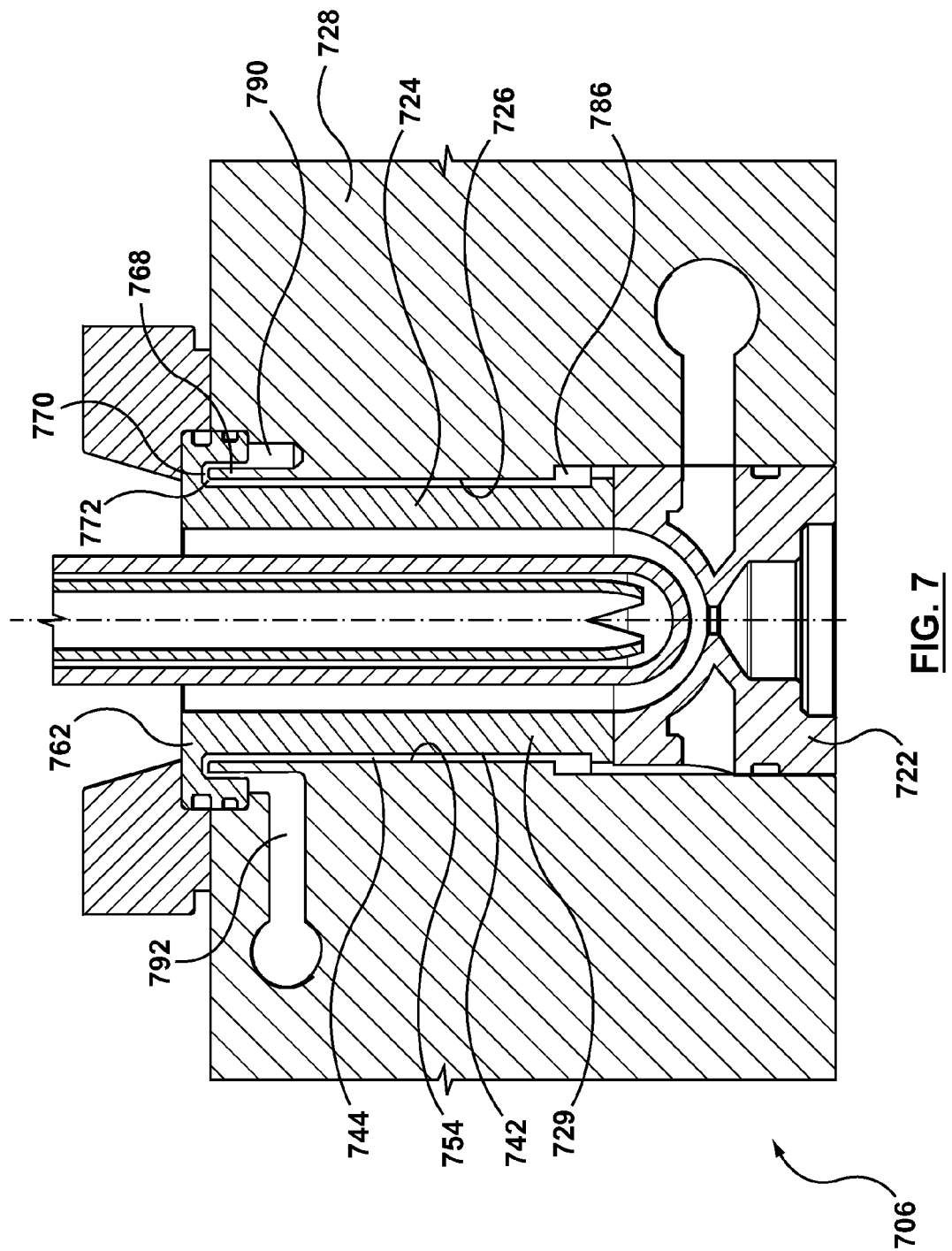
FIG. 7 is an enlarged view of a portion of a mold stack showing another alternate embodiment of the cavity insert.

Referring now to FIG. 7, shown is a further embodiment of cavity insert 724 according to the present invention. In the description of this embodiment, the embodiment detailed in FIGS. 1 and 2 can be referenced for additional description of like parts, as only differences are discussed in detail below. Features and aspects described in other embodiments can be used accordingly with the present embodiment, and visa versa.

Cavity assembly 706 includes a gate insert 722 and cavity insert 724 located in series within a bore 726 extending through a cavity plate 728. Unlike the cavity inserts detailed in the FIGS. 1 through 4, and similar to that detailed in FIGS. 5 and 6, cavity insert 724 is a one-piece component comprised of a cavity insert body 729. In this form, cavity insert body 729 is configured to seat directly within mold plate 728, and by virtue of cavity insert body 729 having at least a portion of an outside surface 742 with an outer diameter that is less than the inner diameter of surface 754 of bore 726, cavity insert cooling chamber 744 is formed therebetween.

Cavity insert cooling chamber 744 is connected to fluidly communicate with first decompression chamber 786 and second decompression chamber 790. In the embodiment shown, first decompression chamber 786 is generally provided as an annular channel formed into bore 726 of cavity plate 728. Second decompression chamber 790 is provided as an annular channel on a downstream surface of cavity plate 728, at an interface between cavity plate 728 and cavity insert body 729. As shown. second decompression chamber 790 is connected so as to fluidly communicate to return line 792 which allows cooling fluid to exit cavity insert 724. As such, the decompression chambers 786/790 are provided between cavity insert 724 and mold plate 728. Although not detailed here, the decompression chambers may alternatively be formed in the cavity insert, as shown in the embodiment detailed in FIG. 6. In addition, the embodiment shown in FIG. 7 provides a hairpin chamber 772 similar to that provided in the embodiment of FIGS. 1, 2 and 2A. To achieve this, cavity plate 728 is provided with a chamber member 768 that positions within a corresponding recess 770 in a downstream region of cavity insert body 729, for example flange 762. Chamber member 768 is configured to be dimensionally smaller than the corresponding recess 770 in flange 762, thereby defining a chamber extension connected in fluid communication to cooling chamber 744, through which cooling fluid is able to flow. For the discussion provided herein, the chamber extension is generally referred to as a hairpin chamber 772, having a generally annular hairpin or double-backed shaped configuration. As such, cooling fluid that flows through cavity insert 724 is directed not only through the main cooling chamber 744 of the elongated body portion, but also the annular loop structure of hairpin chamber 772 adjacent to the split thread inserts. In all other respects, the structural and functional characteristics of cavity insert 724 are generally the same as those described above for the previous embodiments.

It will be understood that all components of the mold stack assembly described herein may be made of suitable material commonly used in injection molding devices. For instance, certain components may be made of conventional tool steel, stainless steel, or other suitable material that is able to withstand changes in temperature or thermal shock, which may occur as a result of the continuous cycling between extreme hot and cold temperatures. Thermally conductive materials may also be implemented where suitable. Some examples of suitable materials for use in constructing the cavity insert include but are not limited to: copper and copper alloys, for example beryllium copper (MOLDMAX beryllium copper alloys, C17000 alloys) and beryllium free copper (AMPCO 940, C18000), aluminum and aluminum alloys, molybdenum and molybdenum alloys (TZM). It will also be understood that the components of the cavity insert, that is inner portion 146 and outer sleeve 148 may be permanently coupled, i.e., fixed or rigidly attached, such as by metallurgic bonding (e.g. brazing, soldering), or shrink fitting, or removably coupled, such as by press fitting.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A mold assembly for an injection molding machine comprising:
   a cavity plate;
   a cavity insert received in a bore in the cavity plate, an outer surface of the cavity insert being in contact with the cavity plate at an upstream point and a downstream point that are longitudinally spaced from each other, wherein a length of the cavity insert between the upstream and downstream points is spaced within the bore from the cavity plate to define at least in part
      an upstream annular decompression chamber for receiving a supply of cooling fluid from a cooling fluid inlet and
      an annular film cooling chamber having an upstream end that is in fluid communication with the upstream annular decompression chamber, wherein a cross-sectional area of the annular film cooling chamber is uniform from the upstream end to a downstream end thereof and is less than a cross-sectional area of the upstream annular decompression chamber, and wherein the annular film cooling chamber is for delivering a cooling fluid received from the upstream annular decompression chamber in a uniform film flow along the length of the cavity insert.

2. The mold assembly of claim 1 further comprising:
   a downstream annular decompression chamber in fluid communication with the annular film cooling chamber at a location spaced from the upstream annular decompression chamber.

3. The mold assembly of claim 2, wherein the downstream annular decompression chamber is in fluid communication with the downstream end of the annular film cooling chamber.

4. The mold assembly of claim 1 further comprising:
   a hairpin chamber in fluid communication with the annular film cooling chamber defined at least in part by the cavity insert, wherein the hairpin chamber provides cooling to the downstream end of the cavity insert.

5. The mold assembly of claim 4, wherein the hairpin chamber is defined between the cavity insert and the cavity plate.

6. The mold assembly of claim 5, wherein the cavity plate includes a chamber member and the hairpin chamber includes a first chamber extension portion extending from the annular film cooling chamber and a second chamber extension portion in fluid communication with the first chamber extension portion with the chamber member of the cavity plate being positioned between the first chamber extension portion and the second chamber extension portion.

7. The mold assembly of claim 6, wherein a radial chamber extension portion is disposed between the first chamber extension portion and the second chamber extension portion.

8. A mold assembly for an injection molding machine comprising:
   a cavity plate;
   a cavity insert received within a bore in the cavity plate, the cavity insert having an inner portion and an outer sleeve, wherein an outer diameter of the inner portion is less than an inner diameter of the outer sleeve such that an annular film cooling chamber having a uniform annular cross-section from an upstream end thereof to a downstream end thereof is defined between opposing surfaces of the inner portion and the outer sleeve, and wherein an annular decompression chamber for receiving a supply of cooling fluid from a cooling fluid inlet is defined between the inner portion and the outer sleeve to be in fluid communication with the upstream end of the annular film cooling chamber, and wherein the annular film cooling chamber is configured for delivering cooling fluid received from the annular decompression chamber in a uniform film flow along a length of the cavity insert that extends between the upstream and downstream ends of the annular film cooling chamber.

9. The mold assembly of claim 8 further comprising:
a hairpin chamber in fluid communication with the annular film cooling chamber defined between the inner portion and the outer sleeve of the cavity insert, wherein the hairpin chamber provides cooling to a downstream end of the cavity insert.

10. The mold assembly of claim 9, wherein the outer sleeve includes a chamber member and the hairpin chamber includes a first chamber extension portion extending from the annular film cooling chamber and a second chamber extension portion in fluid communication with the first chamber extension portion with the chamber member of the outer sleeve being positioned between the first chamber extension portion and the second chamber extension portion.

11. A preform mold assembly comprising:
a cavity plate; and
a cavity insert received in a bore in the cavity plate, the cavity insert defining a mold cavity for forming a body portion of a preform,
wherein the cavity insert defines at least in part an annular decompression chamber for receiving a supply of cooling fluid from a cooling fluid inlet, and an annular film cooling chamber in fluid communication with the annular decompression chamber, wherein the annular film cooling chamber extends in a longitudinal direction to encircle the mold cavity for forming a body portion of a preform and has an annular cross-section continuously from a first end to a second end thereof and wherein the annular film cooling chamber is for creating a film flow of cooling fluid that uniformly flows adjacent to the mold cavity in the longitudinal direction from the first end to the second end of the annular film cooling chamber.

12. The preform mold assembly of claim 11, wherein the annular decompression chamber is a first annular decompression chamber and the assembly further includes a second annular decompression chamber in fluid communication with the annular film cooling chamber at a location spaced from the first annular decompression chamber.

13. The preform mold assembly of claim 12, wherein the first annular decompression chamber is in fluid communication with the first end of the annular film cooling chamber, and the second annular decompression chamber is in fluid communication with the second end of the annular film cooling chamber.

14. The preform mold assembly of claim 12, wherein the annular film cooling chamber has a cross-sectional area that is smaller than the cross sectional area of the first and second annular decompression chambers.

15. The preform mold assembly of claim 12, wherein the annular film cooling chamber, the first annular decompression chamber, and the second annular decompression chamber are defined between the cavity insert and the bore in the cavity plate.

16. The preform mold assembly of claim 15, further comprising:
a hairpin chamber in fluid communication with the annular film cooling chamber defined at least in part by the cavity insert, the hairpin chamber for providing cooling to a downstream end of the cavity insert.

17. The preform mold assembly of claim 16, wherein the hairpin chamber is defined by the cavity insert and the cavity plate.

18. The preform mold assembly of claim 12, wherein the cavity insert comprises an inner portion and an outer sleeve and the annular film cooling chamber, the first annular decompression chamber, and the second annular decompression chamber are defined between the inner portion and the outer sleeve, the outer sleeve is seated in the bore in the cavity plate.

19. The preform mold assembly of claim 18, further comprising:
a hairpin chamber in fluid communication with the annular film cooling chamber defined between the inner portion and the outer sleeve, the hairpin chamber for providing cooling to a downstream end of the cavity insert.

20. The preform mold assembly of claim 19, wherein the hairpin chamber is defined between the inner portion and the outer sleeve.

21. The mold assembly of claim 8, wherein a second annular decompression chamber is defined between the inner portion and the outer sleeve.

* * * * *